Figure 2:
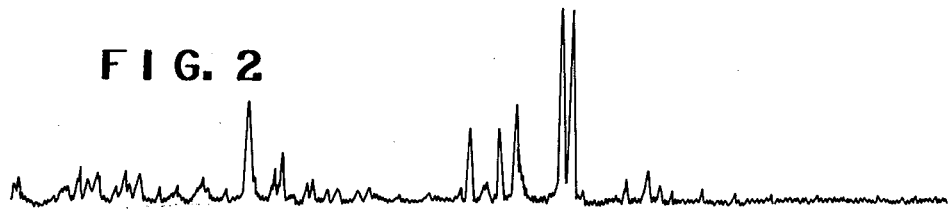

DEGREES 2θ

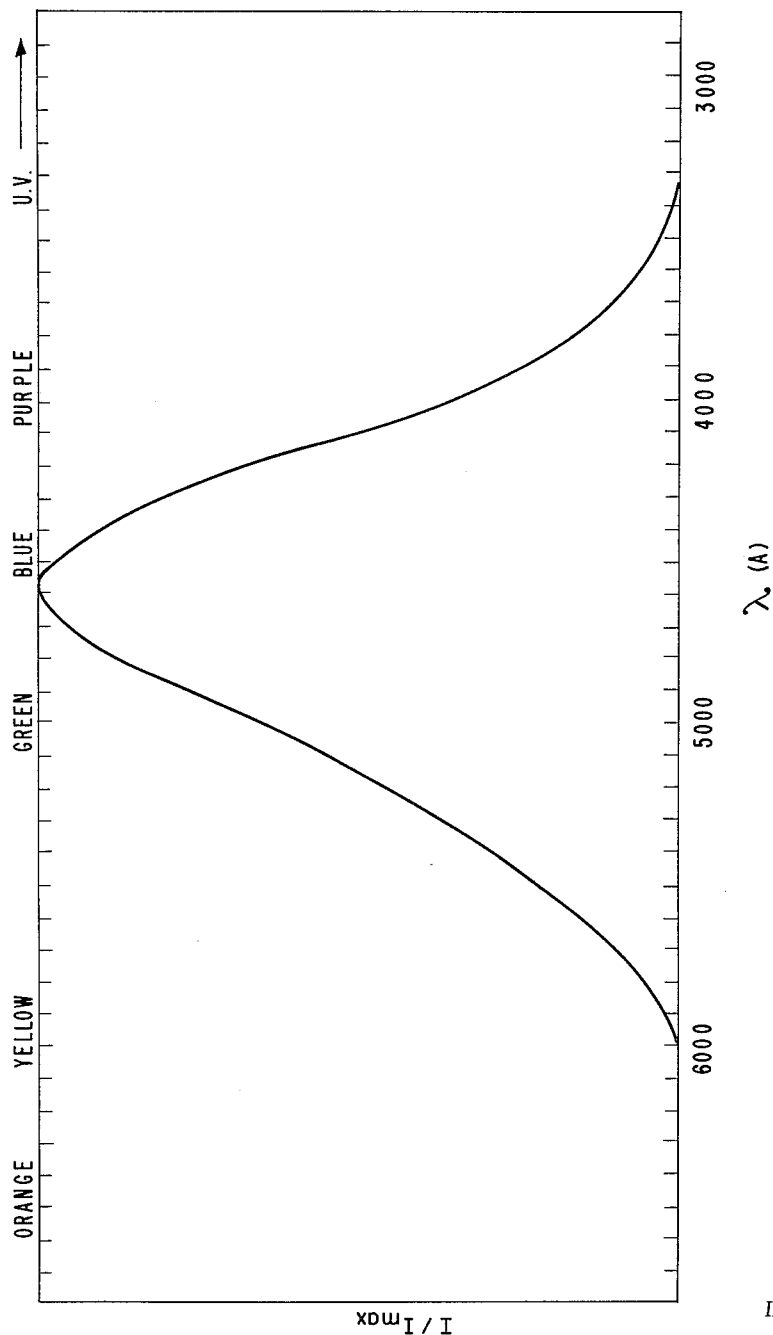

3,207,573
LUMINESCENT MATERIALS

Hans J. Borchardt, Wilmington, Del., assignor to E. I. du Pont de Nemours and Company, Wilmington, Del., a corporation of Delaware
Filed Jan. 24, 1962, Ser. No. 168,399
3 Claims. (Cl. 23—51)

This application is a continuation-in-part of my copending application S.N. 89,164 filed Febrauary 14, 1961.

This invention relates to chemical products and, more particularly, to double oxide compounds and luminescent compositions thereof.

Luminescent materials, including phosphorescent and fluorescent materials, have found wide acceptance in the art in such uses at TV tubes, fluoroescent lights, radiation detectors, rardarscopes and other detection devices. Such luminescent materials emit radiation, for example, visible radiation, on excitation with ultraviolet light, X-rays, cathode rays, and the like. One specific illustration of the use of such materials is as intensifiers for X-ray preduced photographic images. In such use, a screen or layer containing the lumniescent material is placed adjacent to a photographic emulsion and the combination is exposed to X-rays. The X-ray excited luminescent material emits visible radiation which adds to the photographic darkening produced by the small portion of X-rays absorbed in the emulsion.

This invention provides a new class of chemical compounds. These new compounds have been discovered to luminesce upon excitation, for example, by X-rays as well as by cathode rays and ultraviolet radiation and thus provide a new class of materials for use in the luminescent arts, for example, in X-ray screens.

The double oxide compounds of this invention have the formula $WO_3 \cdot M_2O_3$ wherein M is selected from the group consisting of yttrium and lutetium, that is, the compounds of this invention are $WO_3 \cdot Y_2O_3$ and

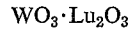

$$WO_3 \cdot Lu_2O_3$$

The formula for the compounds of this invention can, alternately, be written $M_2WO_6$ or $M_2O_3 \cdot WO_3$, or specifically, $Y_2WO_6$ and $Lu_2WO_6$, or $Y_2O_3 \cdot WO_3$ and $LU_2O_3 \cdot WO_3$.

The compounds of the instant invention are conveniently prepared by intimately mixing a rare earth containing reactant and a tungsten containing reactant and heating the resulting mixture at elevated temperatures in a nonreducing atmosphere such as static air. The reactants are preferably the oxides, that is, $WO_3$ and $Y_2O_3$ or $Lu_2O_3$, and in such case the process leading to the compounds of this invention simply involves contacting an intimate mixture of the powdered oxides of tungsten and yttrium or lutetium in appropriate concentrations, optionally pressing the oxide mixture into a desired shape, and heating the mass in air at atmospheric pressures at elevated temperatures. Instead of the oxides as such, chemically equivalent amounts of compounds of the metals concerned which can be converted to the oxides can be added. These are then converted to the oxides during heating to the firing temperature. Such compounds can be organic or inorganic. Examples in the cases or yttrium and lutetium are the carbonates, oxalates, hydroxides, acetates, citrates, and the like of yttrium and lutetium. Examples in the case of tungsten, that is, the tungsten-containing reactant, are tungstic acid, ammonium tungstate, organic derivatives of tungstic acids, etc. The two oxides, or compounds liberating the same, are intimately mixed by any of the methods known to the ceramic art. The materials of the mixture are preferably both in a finely divided state, and dry mixing is preferred over wet mixing. Optionally, to the mixture of oxides, a suitable binder, usually in a solvent, can be added in an amount sufficient to allow the mixture to be pressed into the desired shape. Binders suitable for this purpose are well known and include solutions of waxy materials such as paraffin, solutions of stearic acid, camphor, starch, and the like. A solution of paraffin and petroleum ether has been found particularly satisfactory for this purpose. The binder remains during the pressing technique but escapes during firing.

The preparative procedure preferably utilizes tungstic oxide and yttrium oxide or lutetium oxide, or their chemically equivalent compounds in essentially stoichiometric quantities, that is, in equimolar quantities. This represents the preferred operating procedure and provides products in essentially pure form. The reaction temperatures, that is, the temperature during the firing step, can be between about 900 and 1400 or 1500° C., or even higher provided the melting point of the reaction mixtures is not exceeded. Reaction temperatures in the range of 1100 to 1500° C. are preferred. In general, the reaction time varies inversely with the reaction temperature; for example, with $WO_3 \cdot Y_2O_3$ the reaction is substantially complete in about 24 hours at about 1100° C., while at 1400° C. the reaction takes about 1 to 4 hours.

The compounds of this invention can be characterized by conventional X-ray powder diffraction techniques which show that these compounds are single, distinct chemical entities. The X-ray patterns for $WO_3 \cdot Y_2O_3$ and $WO_3 \cdot Lu_2O_3$ are different from those of the starting materials therefor and are not a superimposition thereon. The X-ray pattern for the reaction products obtained employing an excess of either of the reactants contain all the lines of the compounds of this invention plus additional lines characteristic of the excess reactants per se or of other compounds formed in the yttrium or lutetium oxide-tungstic oxide system, thus establishing that the compounds of this invention are distinct, single-phase products. The X-ray patterns of the products of this invention persist without change even when the products are heated at temperatures above the reaction temperature, but below the melting point of the mass for prolonged periods, thereby indicating that the X-ray pattern for the products is not due to the presence of any transient phase.

Although, as indicated above, X-ray powder diffraction techniques are used to characterize the products of this invention, it is recognized, for instance, that X-ray powder patterns may not reveal the presence of a phase unless about 5% of that phase is present. Because the stoichiometric formulae for each of the compounds of this invention herein described has been established by the molar ratios of the oxides yielding only one phase as detected by powder diffraction, it is possible, although not likely, that the stated formulae may deviate by an amount consistent with the aforementioned limitation and should be so interpreted. The X-ray diffraction patterns of each of the compounds described herein can be conveniently determined on a Norelco X-ray diffraction unit using a recording spectrometer, $CuK_\alpha$ radiation, 1% slits, a nickel filter and a scan rate of 1° of $2\theta$/minute. If greater resolution is desired, a Guinier camera can be employed.

Each of the compounds of this invention emits visible light when exposed, for example, to ultraviolet light including short wave length ultraviolet light, e.g., 2537 A. light, as well as long wave length ultraviolet light, e.g., 3660 A. light, and to X-rays and cathode rays. The compositions of this invention are useful in X-ray detectors including X-ray screens and as luminophors in luminescent screens as employed, for example, in fluorescent lights, radiation detectors, radarscopes and luminescent signs. In such uses, one or both compounds of this invention can be finely ground and, if desired, mixed with other luminescent materials to yield products emitting light of the desired characteristics. As is conventional in the art, for example, the compositions of this invention can be finely ground and mixed with conventional organic and inorganic phosphor binders, and usually solvent for the binder, to yield compositions of this invention readily adaptable for formation into coherent luminescent sheets, films, coatings and other shaped articles. Examples of such binders include organic polymeric binders such as nitrocellulose, polymethyl methacrylate, polyvinyl chloride, polyethylene and chlorosulfonated polyethylene; inorganic binders such as sodium silicate and potassium silicate; and other binders which are substantially transparent and do not appreciably absorb emitted radiation.

As has been pointed out hereinbefore, the compounds of this invention are preferably prepared by mixing appropriate yttrium or lutetium and tungsten reactants in essentially equimolar proportions. With specific regard to the luminescence of the reaction products obtained, it is to be understood that even with excesses of the reactants or with the introduction of inert substances, luminescence will appear as long as the $WO_3 \cdot Y_2O_3$, $WO_3 \cdot Lu_2O_3$ or mixtures thereof are present. For example, in the preparation of $WO_3 \cdot Lu_2O_3$, reaction products prepared from a mixture of reactants containing Lu and W in a molecular ratio of 1.8 to 2.2/1, respectively, have substantially equal brightness on excitation with 2537 A. ultraviolet light. The compounds of this invention provide a new host lattice and, of course, the luminescent characteristics may be altered by the addition of appropriate impurity elements.

In the following examples which illustrate this invention, parts and percentages are by weight unless otherwise indicated.

EXAMPLE I

Yttrium oxide (0.9738 part by weight, particles size approximately $2\mu$ as measured in a Fischer subsieve sizer) and 1.000 part by weight of tungstic oxide (particle size approximately $8\mu$) are mixed dry on a vibrating mixer for approximately 3 minutes. A paste is made by adding a 0.5% solution of paraffin in petroleum ether, and the mixture is pressed into the form of a pellet in a die. The pellet is slowly heated in air in platinum to 300–400° C. at a rate of about 20° C. per minute to allow the binder to burn off slowly, and then the temperature is increased to 1000° C. for 1 hour. Heating at this temperature imparts green strength. The pellet is then transferred to a silicon carbide resistance furnace where heating in air is continued at 1400° C. for 4 hours. X-ray examination indicates the presence of only one phase, $WO_3 \cdot Y_2O_3$.

The double oxide compound $WO_3 \cdot Y_2O_3$, prepared as described above, is a white solid that melts incongruently at about 1700° C. The X-ray pattern for this compound is shown in the following table and in FIGURE 1:

*Table I.—X-ray diffraction data*

[$WO_3 \cdot Y_2O_3$]

| Line No. | $2\theta$* | d | $I/I_0$ |
| --- | --- | --- | --- |
| 1 | 17.55 | 5.05 | 20 |
| 2 | 18.54 | 4.78 | 20 |
| 3 | 20.57 | 4.31 | 2 |
| 4 | 20.99 | 4.23 | 10 |
| 5 | 22.50 | 3.95 | 15 |
| 6 | 23.23 | 3.83 | 15 |
| 7 | 24.25 | 3.66 | 20 |
| 8 | 28.10 | 3.17 | 2 |
| 9 | 28.93 | 3.08 | 90 |
| 10 | 29.55 | 3.02 | 100 |
| 11 | 32.22 | 2.77 | 10 |
| 12 | 32.55 | 2.75 | 25 |
| 13 | 33.60 | 2.66 | 25 |
| 14 | 34.35 | 2.61 | 10 |
| 15 | 35.55 | 2.52 | 20 |
| 16 | 36.15 | 2.48 | 2 |
| 17 | 38.15 | 2.36 | 5 |
| 18 | 41.40 | 2.179 | 2 |
| 19 | 41.95 | 2.151 | 10 |
| 20 | 42.40 | 2.130 | 10 |
| 21 | 43.35 | 2.085 | 2 |
| 22 | 44.05 | 2.054 | 2 |

*Table I—Continued*

| Line No. | $2\theta$* | d | $I/I_0$ |
| --- | --- | --- | --- |
| 23 | 44.55 | 2.032 | 5 |
| 24 | 45.45 | 1.994 | 5 |
| 25 | 45.85 | 1.977 | 5 |
| 26 | 47.45 | 1.914 | 20 |
| 27 | 48.15 | 1.888 | 15 |
| 28 | 49.15 | 1.852 | 5 |
| 29 | 49.70 | 1.833 | 40 |
| 30 | 50.20 | 1.816 | 2 |
| 31 | 51.3 | 1.779 | 10 |
| 32 | 52.15 | 1.752 | 2 |
| 33 | 52.75 | 1.734 | 10 |
| 34 | 54.15 | 1.692 | 5 |
| 35 | 54.50 | 1.682 | 5 |

*$CuK_\alpha$ radiation.

Notes.—Lines 16–35 appear to be closely spaced double lines.

Figure 1:
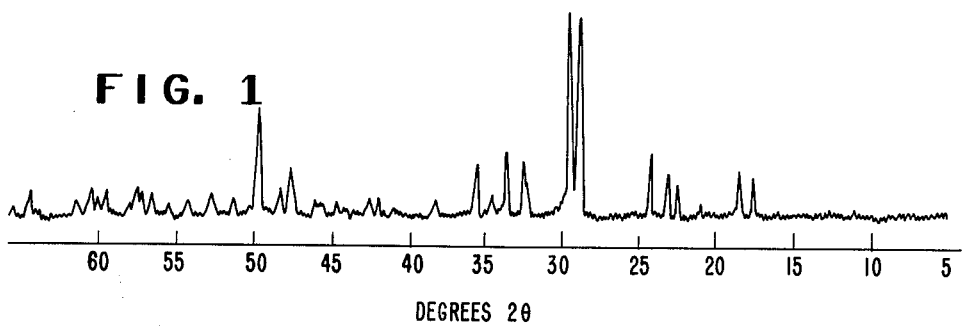

In the above table and in FIGURE 1, $\theta$ represents the angle of the reflected X-ray beams.

The $WO_3 \cdot Y_2O_3$ described above emits light when irradiated with long (3660 A.) and short (2537 A.) wave length ultraviolet light, with X-rays generated in a copper target tube operating at 35 kv. and 20 microamperes and with 30 kv. electrons. The brightness number, B. No., and color of the radiation emitted on such excitation are:

| Excitation | B. No. | Color |
| --- | --- | --- |
| 3660 A. U.V. | 2 | White. |
| 2537 A. U.V. | 4 | Do. |
| X-ray | 4 | Blue. |
| 30 k.v.e⁻ | 2 | Do. |

Brightness number is a qualitative scale ranging from 0 to 5; 0 corresponds to no emission, 1 to emission which is just barely observable, etc., and 4 is the brightness of commercial X-ray intensifier phosphors such as $CaWO_4$ when subjected to X-rays as described above.

FIGURE 3 shows the emission spectra for $WO_3 \cdot Y_2O_3$ on excitation with 2537 A. U.V. from filtered, low-pressure mercury discharge and correlates relative intensity, $I/I_{max}$, with wave length $\lambda(A.)$ of emitted light. Relative intensity is determined by dividing the intensity of emission at a given wave length by the maximum intensity measured, the intensity at 4590 A. The detector employed in determining the curve is shown in FIGURE 3 is a Du Mont 6292 photomultiplier tube.

As noted hereinbefore, the compounds of this invention can be mixed with binder and solvent and formed into various luminescent screens. The concentration of solvent and binder in such compositions can vary greatly depending, for example, upon the particular type of screen involved and the method of application of the luminescent composition. Thus, for example, in compositions for X-ray screens, the concentration of binder can vary from an amount just sufficient to bind the luminophor particles together, for example, 2 to 5% binder based on the weight of luminophor, to 20% or even more based on the weight of luminophor. Typically, for example, a composition of this invention can be prepared by dispersing 55 to 57 parts of finely ground $WO_3 \cdot Y_2O_3$ in a solution of 5 to 3 parts of nitrocellulose and 1 to 3 parts of plasticizer therefor dissolved in 40 parts of an equal weight mixture of n-amyl acetate and n-butyl acetate. The resulting composition can then be used in fabricating an X-ray screen in the conventional manner, for example, by casting the composition onto a thin protective film of nitrocellulose, partially drying the resulting product, then applying a backing layer, for example, of cardboard, to the luminophor coating to form the composite screen.

EXAMPLE II

Lutetium oxide (1.0298 parts) and 0.6000 part of tungstic oxide are intimately mixed on a vibratory mixer. The mixture is pressed into a pellet and heated at 1400° C.

for 4 hours in static air. The resulting single-phase product is the double oxide $WO_3 \cdot Lu_2O_3$ which is a white solid.

The X-ray pattern for the $WO_3 \cdot Lu_2O_3$ prepared as described above is shown in the following table and in FIGURE 2:

*Table II.—X-ray diffraction data*

[$WO_3 \cdot Lu_2O_3$]

| Line No. | $2\theta$* | d | $I/I_o$ |
|---|---|---|---|
| 1 | 16.4 | 5.40 | 4 |
| 2 | 18.8 | 4.72 | 4 |
| 3 | 20.85 | 4.26 | 4 |
| 4 | 22.80 | 3.897 | 4 |
| 5 | 23.60 | 3.767 | 7 |
| 6 | 24.50 | 3.630 | 13 |
| 7 | 25.85 | 3.444 | 8 |
| 8 | 28.50 | 3.129 | 4 |
| 9 | 29.20 | 3.056 | 100 |
| 10 | 30.00 | 2.976 | 100 |
| 11 | 32.20 | 2.778 | 4 |
| 12 | 32.65 | 2.740 | 15 |
| 13 | 33.00 | 2.712 | 34 |
| 14 | 34.05 | 2.631 | 27 |
| 15 | 34.85 | 2.572 | 8 |
| 16 | 35.10 | 2.554 | 4 |
| 17 | 36.00 | 2.492 | 28 |
| 18 | 36.55 | 2.456 | 4 |
| 19 | 38.62 | 2.329 | 2 |
| 20 | 40.05 | 2.249 | 3 |
| 21 | 42.05 | 2.147 | 3 |
| 22 | 42.45 | 2.127 | 4 |
| 23 | 43.25 | 2.090 | 4 |
| 24 | 44.65 | 2.028 | 4 |
| 25 | 45.25 | 2.002 | 6 |
| 26 | 46.15 | 1.965 | 8 |
| 27 | 46.60 | 1.947 | 8 |
| 28 | 47.55 | 1.911 | 3 |
| 29 | 48.10 | 1.890 | 17 |
| 30 | 48.15 | 1.888 | 13 |
| 31 | 50.02 | 1.822 | 8 |
| 32 | 50.30 | 1.812 | 32 |
| 33 | 50.45 | 1.807 | 36 |

*$CuK_\alpha$ radiation.

The brightness number and color of radiation emitted by the product of this example when it is subjected to various types of excitation as described in Example I are:

| Excitation | B. No. | Color |
|---|---|---|
| 3660 A. U.V. | 2 | White. |
| 2537 A. U.V. | 4 | Do. |
| X-ray | 4 | Blue. |
| 30 k.v.e⁻ | 2 | Do. |

The emission spectra for $WO_3 \cdot Lu_2O_3$ on excitation by 2537 A. U.V., determined by the procedure described in Example I, is substantially the same as that for $WO_3 \cdot Y_2O_3$ shown by FIGURE 3.

The $WO_3 \cdot Lu_2O_3$ described above can be employed in the emitting layer in fluorescent lights. For example, finely ground $WO_3 \cdot Lu_2O_3$ can be dispersed in a dilute cellulose lacquer. The lacquer is then run through a fluorescent light tube and the coating deposited on the inside surface thereof is dried. Finally, the binder is burned off to leave a coating of $WO_3 \cdot Lu_2O_3$ on the inner surface of the tube. For a standard 40 watt light (120 cm. long, 3.8 cm. dia.) about 1 to 4 grams of luminophor are deposited, depending on the particle size of the luminophor.

I claim:
1. A double oxide compound having the formula $WO_3 \cdot M_2O_3$ where M is selected from the group consisting of yttrium and lutetium.
2. The double oxide compound $WO_3 \cdot Y_2O_3$.
3. The double oxide compound $WO_3 \cdot Lu_2O_3$.

References Cited by the Examiner

UNITED STATES PATENTS 2,372,071  3/45  Fernberger _____ 252—301.5 XR
3,114,067  12/63  Henderson _____ 252—301.5 XR

OTHER REFERENCES

Hoffman, Lexicon der Anorganischen Verbindunges, Band 2, No. 56–81, page 748.

Gmelin-Krauts, Handbuch der Anorganischen Chemie, Band VI, Alleibung 2 (1928–32), page 753.

MAURICE A. BRINDISI, *Primary Examiner.*